(12) United States Patent
Weisgerber et al.

(10) Patent No.: US 8,959,056 B1
(45) Date of Patent: Feb. 17, 2015

(54) METHOD AND APPARATUS FOR EVALUATING A BACKUP POLICY IN A COMPUTER NETWORK

(75) Inventors: William R. Weisgerber, Lake Mary, FL (US); Harold J. Dellenger, Longwood, FL (US)

(73) Assignee: Symantec Corporation, Mountain View, CA (US)

( * ) Notice: Subject to any disclaimer, the term of this patent is extended or adjusted under 35 U.S.C. 154(b) by 1649 days.

(21) Appl. No.: 11/704,010

(22) Filed: Feb. 8, 2007

(51) Int. Cl.
*G06F 17/30* (2006.01)

(52) U.S. Cl.
USPC .......................................................... 707/653

(58) Field of Classification Search
USPC ................................................ 707/204, 665
See application file for complete search history.

(56) References Cited

U.S. PATENT DOCUMENTS

| | | | |
|---|---|---|---|
| 5,966,730 A * | 10/1999 | Zulch | 711/162 |
| 8,301,772 B2 * | 10/2012 | Zeis et al. | 709/226 |
| 2002/0147734 A1 * | 10/2002 | Shoup et al. | 707/200 |
| 2004/0205206 A1 * | 10/2004 | Naik et al. | 709/230 |
| 2005/0015641 A1 * | 1/2005 | Alur et al. | 714/2 |
| 2006/0136701 A1 * | 6/2006 | Dickinson | 712/205 |
| 2006/0259901 A1 * | 11/2006 | Kaplan | 717/168 |
| 2008/0244601 A1 * | 10/2008 | Zeis et al. | 718/104 |
| 2009/0083749 A1 * | 3/2009 | Creamer et al. | 718/104 |

* cited by examiner

*Primary Examiner* — Ajay Bhatia
*Assistant Examiner* — Kurt Mueller
(74) *Attorney, Agent, or Firm* — Campbell Stephenson LLP

(57) ABSTRACT

Method and apparatus for evaluating a backup policy in a computer network is described. In one example, a control limit is established for each of a plurality of backup tasks in the backup policy based on a set of backup statistics. An aggregate requirement for the backup policy is computed by combining control limits for the plurality of backup tasks. The aggregate requirement is compared with aggregate capabilities of the computer network. The backup policy is evaluated based on the results of the comparison.

21 Claims, 3 Drawing Sheets

METHOD AND APPARATUS FOR EVALUATING A BACKUP POLICY IN A COMPUTER NETWORK

BACKGROUND OF THE INVENTION

1. Field of the Invention

Embodiments of the invention generally relate to backup processes in computer networks and, more specifically, to a method and apparatus for evaluating a backup policy in a computer network.

2. Description of the Related Art

Computer systems and their components are subject to various failures that may result in the loss of data. For example, a storage device used in or by the computer system may experience a failure (e.g., mechanical, electrical, magnetic, etc.) that may make any data stored on the device unreadable. Erroneous software or hardware operation may corrupt the data stored on a storage device and effectively destroy the data stored on an otherwise properly functioning storage device.

To mitigate the risk of losing data, computer networks include backup systems for making backup copies of data stored on various storage devices. One type of backup system includes a dedicated backup server that backs up target data on one or more storage devices used in or by one or more computer systems, such as workstations and/or application servers. The backup server typically backs up the target data periodically according to a schedule. The data may be backed up initially to disk-based storage and then migrated to an archival storage, such as tape-based storage. The backup server may implement any of various known schemes to backup data, including full backups, incremental backups, differential backups, and the like. A full backup is a complete copy of the target data. An incremental backup is a backup that only contains the files that have changed since the most recent backup (either full or incremental). A differential backup is a cumulative backup of all changes made since the last full backup. If a backup fails to run as intended, data can be lost. The backup server typically operates in accordance with a backup policy that defines various parameters, such as the target data, the time window to perform the backup process, and the like.

When a backup fails to execute as intended, the computer system is exposed to the possibility of data loss. A backup may fail, for example, if the size of the data to be backed up exceeds the space available to store the backed up data. In another example, a backup may fail if the backup process takes longer to perform than the amount of time allocated to the backup tasks. To guard against backup failures, a computer system typically includes excess storage capacity to ensure that most backup tasks succeed. This excess system capacity, however, is costly. It is thus desirable to be able to determine whether an existing computer system is sufficiently capable of meeting the backup requirements.

Therefore, there is a need for a method or apparatus that would assist in determining the sufficiency of a backup policy without resorting to costly solutions.

SUMMARY OF THE INVENTION

Method and apparatus for evaluating a backup policy in a computer network is described. In one embodiment, a control limit is established for each of a plurality of backup tasks in the backup policy based on a set of backup statistics. An aggregate requirement for the backup policy is computed by combining control limits for the plurality of backup tasks. The aggregate requirement is compared with aggregate capabilities of the computer network. The backup policy is evaluated based on the results of the comparison.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
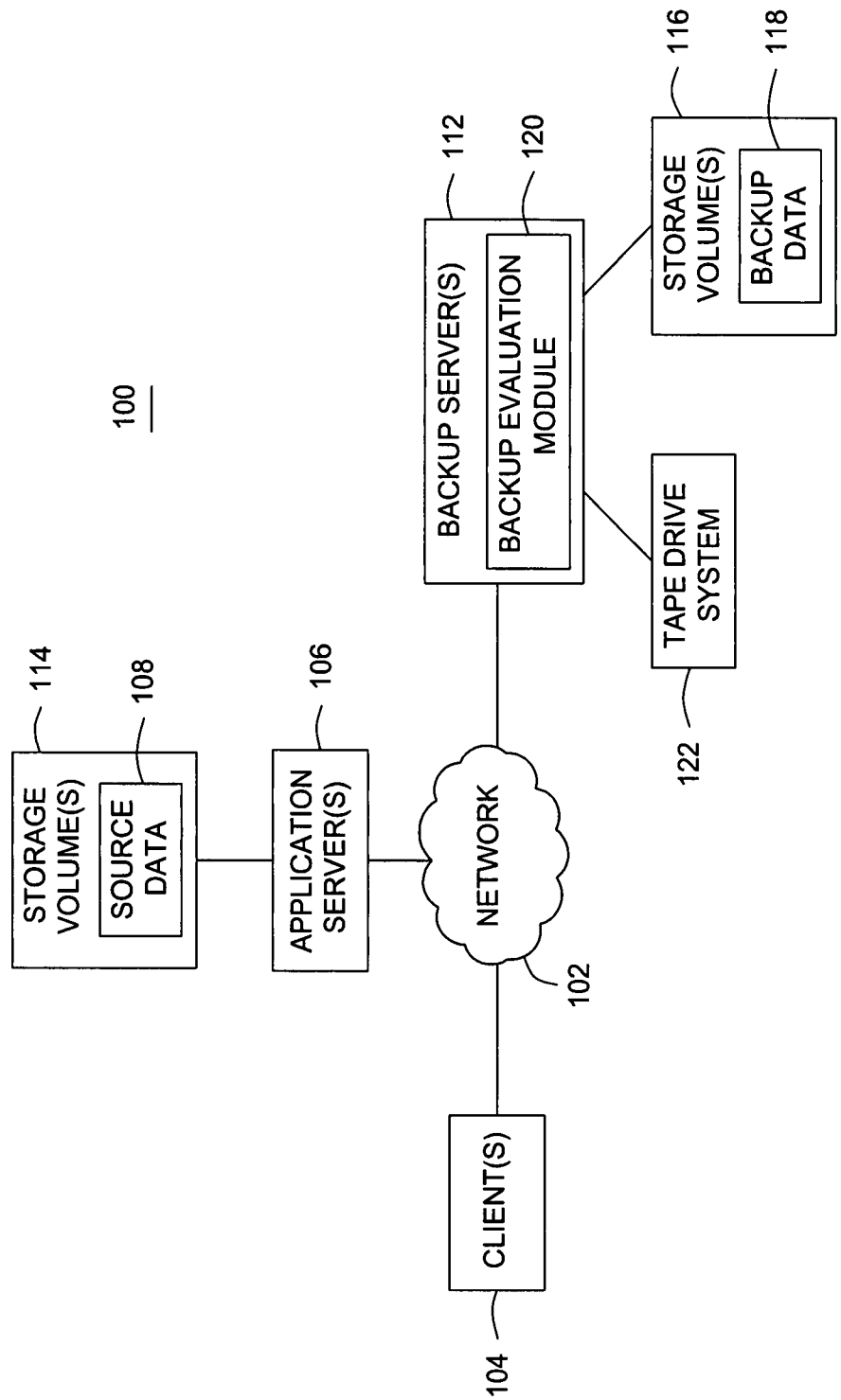
FIG. 1 is a block diagram depicting an exemplary embodiment of a networked computer system in accordance with one or more aspects of the invention.

FIG. 1 is a block diagram depicting an exemplary embodiment of a networked computer system 100 in accordance with one or more aspects of the invention. The system 100 includes a network 102, clients 104, one or more application servers 106, and one or more backup servers 112. The clients 104 are configured for communication with the application servers 106 via the network 102. The network 102 comprises a communication system that connects computer systems by wire, cable, fiber optic, and/or wireless links facilitated by various types of well-known network elements, such as hubs, switches, routers, and the like. The network 102 may employ various well-known protocols to communicate information. The clients 104 may comprise various types of computers, such as laptops, desktop computers, workstations, and the like. The application servers 106 host services for the clients 104. For example, the application servers 106 may include file servers, e-mail servers, terminal servers, and/or the like. The application servers 106 may be implemented using any type of computer systems capable of hosting services for the clients 104.

The application servers 106 manage one or more storage volumes 114. The storage volumes 114 may be implemented using any type of storage system or storage systems, such as a disk drive system. A disk drive system may include, for example, one or more storage disks, e.g., an array of storage disks or redundant array of storage disks. A volume is a logical storage construct that does not necessarily correspond to any particular physical storage device. A physical storage device may include more than one volume, and a volume may span more than one storage device. The storage volumes 114 store source data 108, such as application programs and program data created and managed by the application servers 106. The source data is organized into a file system. A file system refers to the structure and arrangement of files in a storage device. For example, a file system typically includes a hierarchy of directories, each of which may contain one or more files.

The backup servers 112 host a backup service for the application servers 106. The backup servers 112 may be implemented using any type of computer systems capable of hosting a backup service. The backup servers 112 are configured to manage one or more storage volumes 116. The storage volumes 116 may be implemented using the same storage system that implements the storage volume 114, or using a separate storage system (e.g., a separate disk drive system). The backup servers 112 are also coupled to a tape drive system 122. The tape drive system 122 may include one or more tape drives. The storage volume 116 stores backup data 118 that comprises a backup of the source data 108. The backup data 118 may then be migrated to the tape drive system 122.

In particular, the backup servers 112 are configured to back up the source data 108 in accordance with a backup policy. The backup policy includes a series of backup tasks and a time window for performing these tasks in a given execution cycle. A task includes an instruction to backup a particular item of data, such as, a particular storage volume, a particular file system, a particular storage device, or the like. The backup policy also dictates the particular schedule for performing the backup tasks. For example, a given task may be executed hourly, daily, weekly, monthly, or over like type execution cycles.

The backup servers 112 are also configured to maintain various statistics related to the backup service ("backup statistics"). The backup statistics include, for example, time-series data on the size of backup tasks, the time it takes to complete backup tasks, errors that occur during the backup tasks, and the like. Since the backup tasks are performed at regular intervals, the backup statistics include historical measurements of overall performance of the backup service.

In accordance with one aspect of the invention, one or more of the backup servers 112 includes a backup evaluation module 120. The backup evaluation module 120 is configured to evaluate the backup policy implemented by the backup servers 112 and determine the probability that the backup policy will be successful. The backup evaluation module 120 is configured to evaluate the backup policy based on the backup statistics. For example, statistics obtained from prior backup operations may be used to determine the probability of successful backup operations in the future. This determination allows a user to optimize the reliability of the backup servers 112 and reduce system costs.

Figure 2:
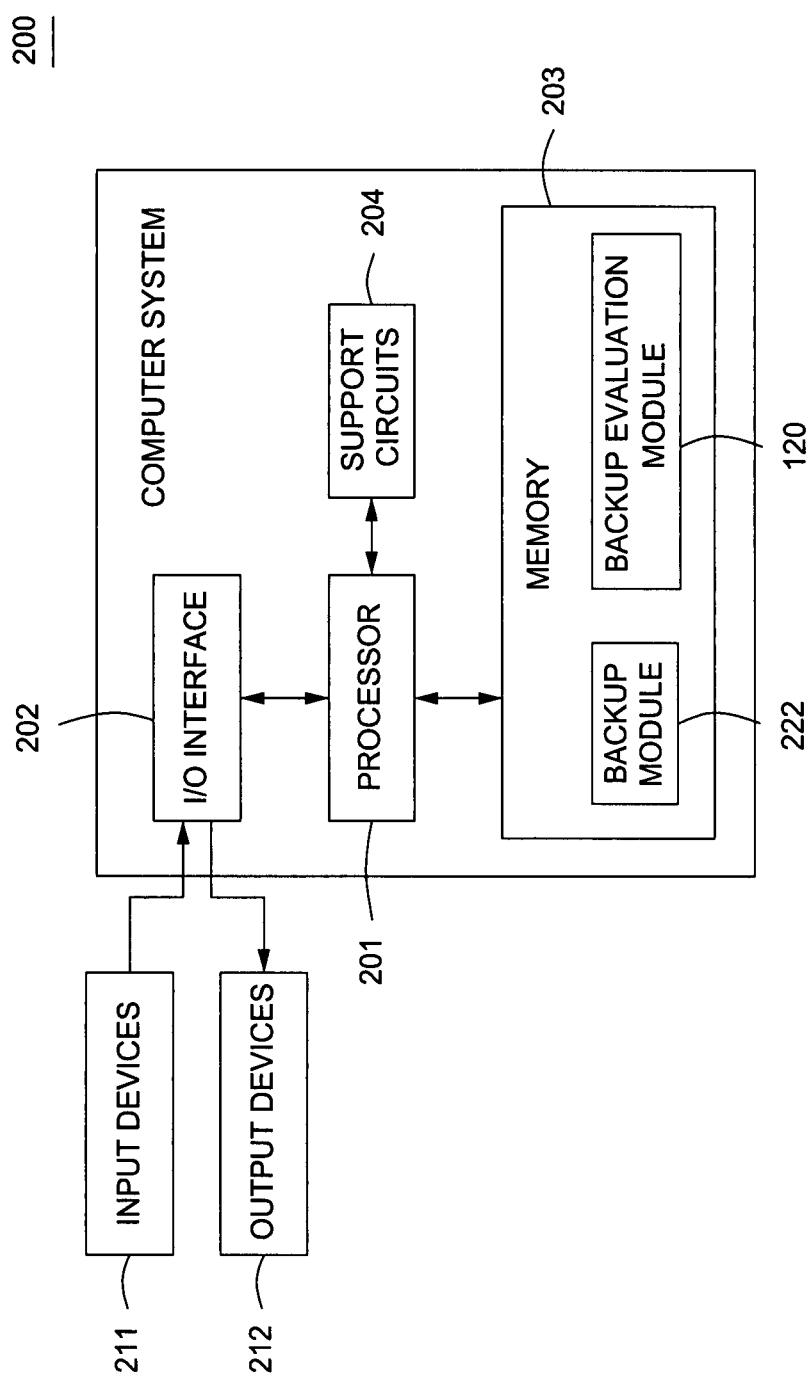
FIG. 2 is a block diagram depicting an exemplary embodiment of a computer system in accordance with one or more aspects of the invention.

FIG. 2 is a block diagram depicting an exemplary embodiment of a computer system 200 in accordance with one or more aspects of the invention. The computer system 200 may be used to implement one or more of the backup servers 112. The computer system 200 includes a processor 201, a memory 203, various support circuits 204, and an I/O interface 202. The processor 201 may include one or more microprocessors known in the art. The support circuits 204 for the processor 201 include conventional cache, power supplies, clock circuits, data registers, I/O interfaces, and the like. The I/O interface 202 may be directly coupled to the memory 203 or coupled through the processor 201. The I/O interface 202 may also be configured for communication with a network, with various storage devices, as well as other types of input devices 211 and output devices 212 (e.g., mouse, keyboard, display, etc).

The memory 203 stores processor-executable instructions and/or data that may be executed by and/or used by the processor 201. These processor-executable instructions may comprise hardware, firmware, software, and the like, or some combination thereof. Modules having processor-executable instructions that are stored in the memory 203 may include a backup module 222 and the backup evaluation module 120. The backup module 222 may be part of a backup service implemented by multiple backup computer systems. That is, backup modules are distributed across multiple computer systems to implement a backup service for a computer network. The backup evaluation module 120 evaluates the backup policy for the backup service, as described further below. The computer system 200 may be programmed with an operating system 220, which may be OS/2, Java Virtual Machine, Linux, Solaris, Unix, Windows, Windows95, Windows98, Windows NT, and Windows2000, WindowsME, and WindowsXP, Windows Server, among other known platforms. At least a portion of an operating system may be disposed in the memory 203. The memory 203 may include one or more of the following random access memory, read only memory, magneto-resistive read/write memory, optical read/write memory, cache memory, magnetic read/write memory, and the like, as well as signal-bearing media as described below.

Figure 3:
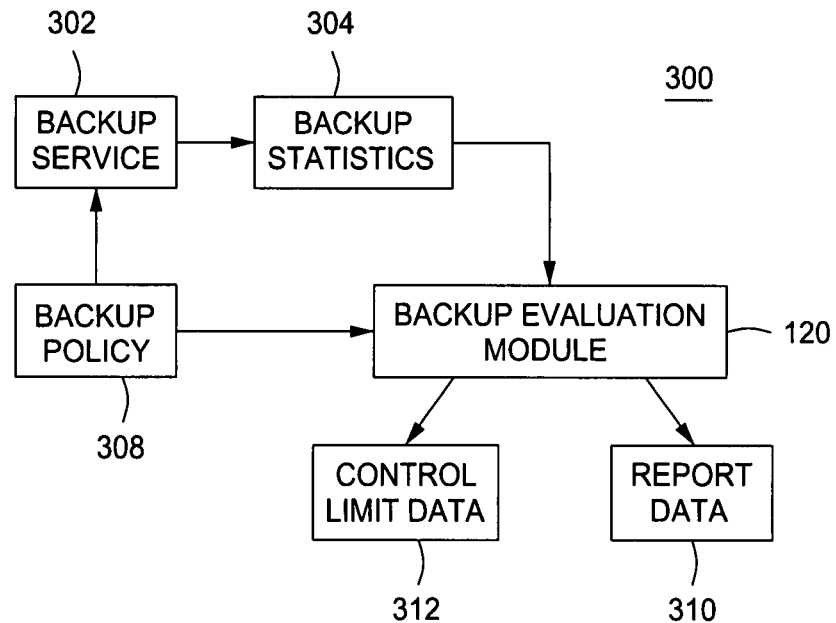
FIG. 3 is an exemplary block diagram depicting an exemplary embodiment of a backup evaluation system in accordance with one or more aspects of the invention.

FIG. 3 is a block diagram depicting an exemplary embodiment of a backup evaluation system 300 in accordance with one or more aspects of the invention. The backup evaluation system 300 includes a backup service 302 and the backup evaluation module 120. The backup service 302 is configured to operate in accordance with a backup policy 308. The backup service 302 targets source data on one or more computers. The backup service 302 may be implemented using one or more backup computer systems. The backup policy 308 includes a plurality of backup tasks. The backup service 302 is also configured to maintain backup statistics 304. In one embodiment, the backup statistics 304 include a distribution of data recorded for various backup tasks that were performed over multiple execution cycles. For example, a distribution of backup task sizes (i.e., used storage space) may be recorded for a given backup task over a plurality of execution cycles. That is, over time, the size of the target source of a given backup task may change. These changes are recorded as part of a distribution for the backup task. In another example, a distribution of backup task execution durations may be recorded for a given task over a plurality of execution cycles. That is, over time, the time it takes to complete the backup task may change. In yet another example, the distribution may include a combination of task size and task duration data points (i.e., a two-dimensional distribution). The backup statistics may further include data indicative of success or failure of backup tasks over the plurality of execution cycles.

The backup evaluation module 120 is configured to obtain the backup statistics 304 and the backup policy 308. The backup evaluation module 120 establishes control limits for various backup tasks that are performed by the backup module 222 based on the backup statistics 304. The backup evaluation module 120 may employ any well-known statistical process control methods to determine the control limits, such as statistical techniques derived from the Central Limit Theorem. In one embodiment, a control limit for a given backup task may be defined by one or more standard deviations of a distribution for the backup task in the backup statistics 304 (e.g., three standard deviations either side of a mean). The backup evaluation module 120 produces control limit data 312.

The backup evaluation module 120 identifies each backup task in the backup policy 308. For each backup task that has sufficient data in the backup statistics 304 (i.e., a control limit has been determined), the backup evaluation module 120 selects the corresponding control limit. If a backup task does not have sufficient history, the backup evaluation module 120 predicts a control limit based on an average distribution determined from the backup statistics 304. The backup evaluation module 120 then computes an aggregate requirement for the backup policy 308 by combining the individual control limits of the backup tasks.

The backup evaluation module 120 compares the aggregate requirement for the backup policy 308 with aggregate capabilities of the computer network. The aggregate capabilities include the amount of actual storage space available to store the backup data and/or the available time window for performing backup tasks. The backup evaluation module 120 uses the comparison results to evaluate the backup policy 308. For example, the backup evaluation module 120 may use the comparison results to evaluate the probability that the computer network will have the needed capacity to perform the backup tasks in the backup policy 308 within the provided time window.

In some embodiments, the aggregate requirement includes process capabilities for the backup tasks in the backup policy 308. A process capability is defined based on a comparison of the observed variations in performance of a backup task, which is implied by the control limits for that task, and the historical results of the task, i.e., the success or failure of the task over time. A backup task that is highly capable can easily and reliably perform the backup, whereas a backup task that is marginally capable will have a higher probability of failure. The process capability for a task may be defined as a process capability coefficient (CpK). In one embodiment, the value of CpK indicates whether the task is highly capable, marginal, or incapable, relative to the backup policy 308 and the aggregate capabilities of the computer network. For example, a CpK value greater than 1.33 is interpreted as a task that has a 33% or more capacity than has ever been needed and thus indicates that the task is highly capable. A CpK value greater than 1.00 is interpreted as a task that has just enough capacity for the maximum performance anticipated and thus indicates that the task is marginally capable. A CpK value less than 1.00 is interpreted as a task that is likely to fail some percentage of the time and thus indicates that the task is incapable. An unacceptable value of CpK for a given backup task can be corrected by either reducing the requirements of the backup policy 308 or increasing the capabilities of the computer network.

In one embodiment, the backup evaluation module 120 generates a report 310 to show the aggregate requirement of the backup policy 308. The report may also show a probability of performance for each backup task in the backup policy 308 accounting for the aggregate requirement and the aggregate capabilities of the computer network. For example, backup tasks scheduled first in the backup policy 308 may have a higher probability of success than backup tasks scheduled later. This may be due to the available storage capacity and/or time window of the computer network. The report may be displayed to a user. The user could then alter the backup tasks in the backup policy 308 in order to improve the probability of success. For example, a backup task may be assigned to a different backup server, use a different storage device, be performed at a different time, or be performed on a different schedule. Also, a combination of such actions may be taken.

Figure 4:
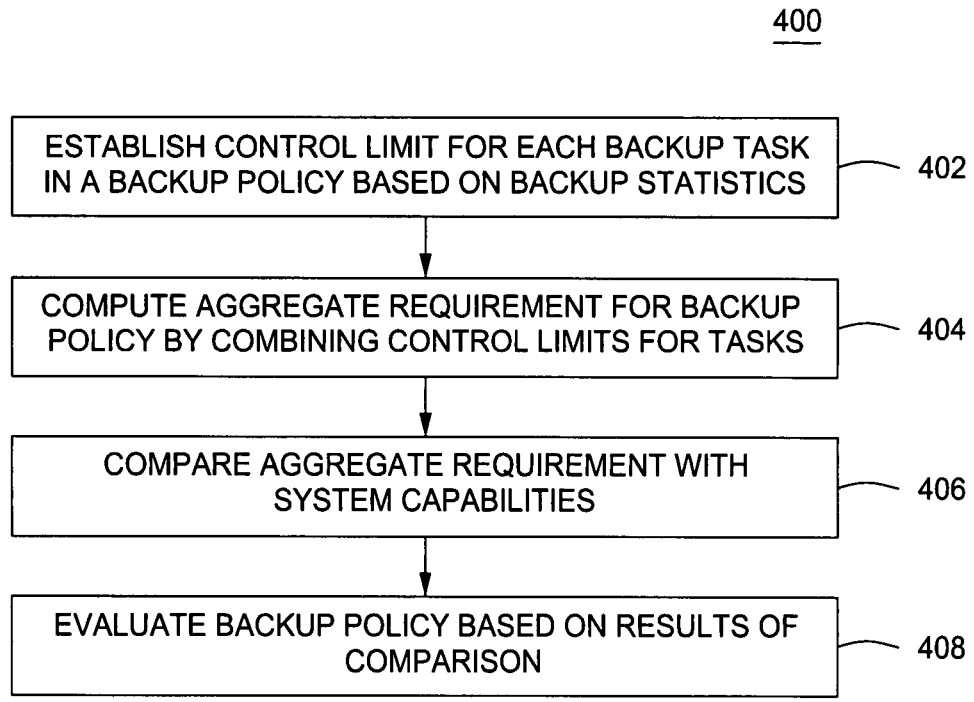
FIG. 4 is a flow diagram depicting an exemplary embodiment of a method for evaluating a backup policy in a computer network in accordance with one or more aspects of the invention.

FIG. 4 is a flow diagram depicting an exemplary embodiment of a method 400 for evaluating a backup policy in a computer network in accordance with one or more aspects of the invention. The method begins at step 402, where a control limit is established for each of a plurality of backup tasks in a backup policy based on a set of backup statistics. At step 404, an aggregate requirement for the backup policy is computed by combining control limits established in step 402. At step 406, the aggregate requirement is compared with aggregate capabilities of the system. At step 408, the backup policy is evaluated based on the results of the comparison at step 406. For example, a report may be generated and displayed to a user that shows the comparison results.

An aspect of the invention is implemented as a program product for use with a computer system. Program(s) of the program product defines functions of embodiments and can be contained on a variety of signal-bearing media, which include, but are not limited to: (i) information permanently stored on non-writable storage media (e.g., read-only memory devices within a computer such as CD-ROM or DVD-ROM disks readable by a CD-ROM drive or a DVD drive); or (ii) alterable information stored on writable storage media (e.g., floppy disks within a diskette drive or hard-disk drive or read/writable CD or read/writable DVD).

While the foregoing is directed to embodiments of the present invention, other and further embodiments of the invention may be devised without departing from the basic scope thereof, and the scope thereof is determined by the claims that follow.

What is claimed is:

1. A method comprising:
receiving a proposed backup policy comprised of a plurality of backup tasks, wherein the proposed backup policy is received from an application server, and wherein each of the plurality of backup tasks comprises an instruction to back up a unit of data;
establishing a quantitative control limit for each of the plurality of backup tasks in the backup policy based on a set of backup statistics maintained by a backup server, wherein the backup statistics include data on a historical success or failure rate of completion of one or more previously executed backup tasks over a plurality of execution cycles;
computing a quantitative aggregate requirement for the backup policy by combining the established quantitative control limits for the plurality of backup tasks wherein the quantitative aggregate requirement represents the aggregate resource requirements of each of the plurality of backup tasks scheduled in the backup policy;
comparing the quantitative aggregate requirement with aggregate capabilities of the computer network;
evaluating the backup policy based on the results of the comparison, wherein said evaluating comprises determining a process capability for each of the plurality of backup tasks in the backup policy; and
if one or more of the process capabilities is unacceptable, altering one or more of the backup tasks in the backup policy in order to improve a probability of success of the backup policy.

2. The method of claim 1, wherein the set of backup statistics includes a distribution of data recorded for at least one backup task of the plurality of backup tasks over a plurality of execution cycles.

3. The method of claim 2, wherein the distribution includes at least one of: (a) backup job sizes or (b) backup job execution durations.

4. The method of claim 2, wherein the quantitative control limit for each of the at least one backup task is defined by one or more standard deviations of the distribution.

5. The method of claim 4, wherein the step of establishing comprises:

predicting the quantitative control limit for each backup task of the plurality of backup tasks other than the at least one backup task based on an average distribution of data.

6. The method of claim 1, wherein the quantitative aggregate requirement includes at least one of: (a) an amount of storage space required by the backup policy or (b) an amount of time required to complete the plurality of backup tasks in the backup policy, and wherein the aggregate capabilities of the computer network include at least one of: (a) an amount of actual storage space or (b) an available time window for performing backup.

7. The method of claim 1, further comprising:
communicating a result of said evaluating, wherein the result is specific to one of the plurality of backup tasks; and
receiving from the application server a revised backup policy, wherein the revised backup policy includes an alteration of the backup task specified by the communicated result.

8. An apparatus comprising:
means for receiving a proposed backup policy comprised of a plurality of backup tasks, wherein the proposed backup policy is received from an application server, and wherein each of the plurality of backup tasks comprises an instruction to back up a unit of data;
means for establishing a quantitative control limit for each of the plurality of backup tasks in the backup policy based on a set of backup statistics maintained by a backup server, wherein the backup statistics include data on a historical success or failure rate of completion of one or more previously executed backup tasks over a plurality of execution cycles;
means for computing a quantitative aggregate requirement for the backup policy by combining the established quantitative control limits for the plurality of backup tasks wherein the quantitative aggregate requirement represents the aggregate resource requirements of each of the plurality of backup tasks scheduled in the back policy;
means for comparing the quantitative aggregate requirement with aggregate capabilities of the computer network;
means for evaluating the backup policy based on the results of the comparison comparison, wherein said evaluating comprises determining a process capability for each of the plurality of backup tasks in the backup policy; and
means for, if one or more of the process capabilities is unacceptable, altering one or more of the backup tasks in the backup policy in order to improve a probability of success of the backup policy.

9. The apparatus of claim 8, wherein the set of backup statistics includes a distribution of data recorded for at least one backup task of the plurality of backup tasks over a plurality of execution cycles.

10. The apparatus of claim 9, wherein the distribution includes at least one of: (a) backup job sizes or (b) backup job execution durations.

11. The apparatus of claim 9, wherein the quantitative control limit for each of the at least one backup task is defined by one or more standard deviations of the distribution.

12. The apparatus of claim 11, wherein the means for establishing comprises:
means for predicting the quantitative control limit for each backup task of the plurality of backup tasks other than the at least one backup task based on an average distribution of data.

13. The apparatus of claim 8, wherein the quantitative aggregate requirement includes at least one of: (a) an amount of storage space required by the backup policy or (b) an amount of time required to complete the plurality of backup tasks in the backup policy, and wherein the aggregate capabilities of the computer network include at least one of: (a) an amount of actual storage space or (b) an available time window for performing backup.

14. The apparatus of claim 8, further comprising:
means for communicating a result of said evaluating, wherein the result is specific to one of the plurality of backup tasks; and
means for receiving from the application server, in response to said communicating, a revised backup policy, wherein the revised backup policy includes an alteration of the backup task specified by the communicated result.

15. A computer network, comprising:
at least one server;
a backup server configured to back up data managed by the at least one server in accordance with a backup policy comprised of a plurality of backup tasks and maintain a set of backup statistics, wherein each of the plurality of backup tasks comprises an instruction to back up a unit of data; and
a backup evaluation module configured to:
receive a proposed backup policy, wherein the proposed backup policy is received from the at least one server;
establish a quantitative control limit for each of the plurality of backup tasks in the backup policy based on the set of backup statistics wherein the backup statistics include data on a historical success or failure rate of completion of one or more previously executed backup tasks over a plurality of execution cycles;
compute a quantitative aggregate requirement for the backup policy by combining the established quantitative control limits for the plurality of backup tasks wherein the quantitative aggregate requirement represents the aggregate resource requirements of each of the plurality of backup tasks scheduled in the backup policy;
compare the quantitative aggregate requirement with aggregate capabilities of the computer network;
evaluate the backup policy based on the results of the comparison, wherein evaluating the backup policy comprises determining a process capability for each of the plurality of backup tasks in the backup policy; and
if one or more of the process capabilities is unacceptable, alter one or more of the backup tasks in the backup policy in order to improve a probability of success of the backup policy.

16. The computer network of claim 15, wherein the set of backup statistics includes a distribution of data recorded for at least one backup task of the plurality of backup tasks over a plurality of execution cycles.

17. The computer network of claim 16, wherein the distribution includes at least one of: (a) backup job sizes or (b) backup job execution durations.

18. The computer network of claim 16, wherein the quantitative control limit for each of the at least one backup task is defined by one or more standard deviations of the distribution.

19. The computer network of claim 18, wherein the backup evaluation module is configured to:
predict the quantitative control limit for each backup task of the plurality of backup tasks other than the at least one backup task based on an average distribution of data.

20. The computer network of claim 15, wherein the quantitative aggregate requirement includes at least one of: (a) an amount of storage space required by the backup policy or (b) an amount of time required to complete the plurality of backup tasks in the backup policy, and wherein the aggregate capabilities of the computer network include at least one of: (a) an amount of actual storage space or (b) an available time window for performing backup.

21. The method of claim 1, wherein the backup policy further comprises a schedule for performing the plurality of backup tasks.

* * * * *